United States Patent [19]

Lizzi et al.

[11] Patent Number: 5,027,106

[45] Date of Patent: Jun. 25, 1991

[54] METHOD AND APPARATUS FOR ELECTRONIC ARTICLE SURVEILLANCE

[75] Inventors: Phillip J. Lizzi, Deptford, N.J.; Paul A. Capone, Norristown, Pa.

[73] Assignee: Checkpoint Systems, Inc., Thorofare, N.J.

[21] Appl. No.: 457,273

[22] Filed: Dec. 27, 1989

[51] Int. Cl.[5] .......................... G08B 13/14; H02J 7/00

[52] U.S. Cl. ...................................... 340/572; 307/66; 340/693

[58] Field of Search .................. 340/572, 309.15, 693, 340/333; 307/66, 86, 23

[56] References Cited

U.S. PATENT DOCUMENTS 3,624,631 11/1971 Chomet et al. ................ 340/572 X
3,938,044 2/1976 Lichtblau ........................ 340/572 X
4,567,473 1/1986 Lichtblau ........................... 340/572
4,728,938 3/1988 Kaltner .............................. 340/572
4,906,974 3/1990 Rehder .......................... 340/572 X

FOREIGN PATENT DOCUMENTS 0287905 8/1988 European Pat. Off. .

*Primary Examiner*—Glen R. Swann, III
*Assistant Examiner*—Thomas J. Mullen, Jr.
*Attorney, Agent, or Firm*—Albert L. Free

[57] ABSTRACT

In an electronic article surveillance system, a low-power supply is used to power the system during ordinary search-and-detect operation, and the increased power needed to transmit high-power signals for deactivating the tag circuit is produced by charging up a rechargable storage device, such as a capacitor or rechargable battery, in the intervals between deactivations and using the charged-up storage device to provide the high supply power needed during deactivation, to generate the deactivation transmission.

10 Claims, 3 Drawing Sheets

METHOD AND APPARATUS FOR ELECTRONIC ARTICLE SURVEILLANCE

BACKGROUND OF THE INVENTION

This invention relates generally to methods and systems for the electronic surveillance of articles, and especially to such systems and methods in which a tag circuit is attached to the articles and is electronically detected if the article is taken past an electronic surveillance station without prior removal or deactivation of the tag circuit.

Electronic article surveillance systems are known in which a so-called tag circuit is secured to the goods in a controlled area on the protected premises, and an exit detector is provided adjacent an exit from the controlled area, past which the article must normally be taken in exiting the premises. The exit detector electronically senses the presence of an active tag circuit on the article, and produces an alarm announcing the unauthorized removal of the article. To effect an authorized removal, the article with tag circuit is normally taken to a check station manned by authorizing personnel, such as a cashier for example, where the tag circuit is removed and/or deactivated in one way or another; subsequent removal of the article past the exit detection system then results in no alarm, as is desired.

If the tag circuit is removed at the check station, it is generally deactivated either permanently for discard, or temporarily for subsequent re-activation and re-use. If the tag circuit is disposable, i.e. can economically be discarded after one use, it can be left attached to the goods when they leave the check station, but in such case the tag circuit should be deactivated before it reaches the exit detector lest it cause a false alarm.

Various methods for deactivating tag circuits have been devised, depending in part upon the nature of the tag circuit. The present invention will be described with particular regard to a tag circuit which is resonant at least at one frequency, so that the presence of the tag circuit can be detected by transmitting signals at and/or near the tag-circuit resonant frequency, and by detecting changes in the signals produced at an adjacent receiver by the resultant resonance in the tag circuit.

It is known to deactivate such a tag circuit by transmitting to it signals at or near the resonant frequency of the tag circuit, at a power level sufficiently high to destroy the original resonant characteristic of the tag circuit. In some cases this may be accomplished by transmitting sufficient power to melt a fusible link in the tag circuit, thereby to render the circuit non-resonant or resonant at a substantially different frequency than the original resonant frequency, whereby its presence will not be detected by the exit detector and false alarms will be avoided. U.S. Pat. No. 4,567,473 of George J. Lichtblau, issued Jan. 28, 1986 describes a system in which the tag circuit is provided with specially thinned regions in a fusible insulator which normally separates, and insulates from each other, active portions of the tag circuit; when high-powered signals at the original resonant frequency of the tag circuit are transmitted to the tag circuit, an arc is formed through the insulator at the thinned region, and the metal of the tag circuit is thereby caused to extend through the resultant fused region to form a short-circuit which destroys, or greatly changes, the resonant characteristic of the tag circuit.

Unfortunately, due to production variations and to the effects of environmental conditions, the resonant frequencies of different tag circuits are typically not all the same. To accommodate this, it is known to sweep the frequency of the transmitter signals repetitively over a substantial range which includes all of the frequencies at which the various tag circuits are likely to be resonant. This phase of operation, during which the frequency is swept to detect presence of a tag circuit, is commonly designated as the search phase or mode. Similarly, it is common to sweep the frequency of the high-powered deactivating signals through the same search range so as to be sure to transmit deactivation signals at the resonant frequency of the tag circuit as required to deactivate the tag circuit.

While such a system is operable and has been used commercially, use of frequency-swept high-power deactivation signals has several drawbacks. First, it requires and wastes substantial amounts of transmitter power, since only the signals at or near the resonant frequency of the tag circuit serve any useful purpose. Secondly, steady transmission of the high-powered, swept-frequency deactivation signals produces unnecessary electrical radiations over a wide frequency band which tend to interfere with operation of other electrical apparatus and which may, in fact, be contrary to Government regulations or laws if transmitted with sufficient power to deactivate the tag circuit.

To minimize these undesirable effects, it is known to use low-power transmissions not only to determine that a tag circuit is present but also to determine what its resonant frequency is, and then to transmit the high-power deactivation signals substantially only at frequencies within the resonance frequency band of the tag circuit. This reduces the total energy needed for deactivation, and also reduces the extent of radio frequency interference.

One such system is described in the above-noted U.S. Pat. No. 4,567,473 of Lichtblau, wherein a digital source produces a staircase of voltage which is applied to a voltage-controlled oscillator (VCO) to produce a corresponding staircase sweep of the frequency of the transmitted tag-search signals. Upon the transmission of a frequency equal to or near the resonant frequency of the tag circuit, a sudden drop in transmitter antenna current occurs, which drop in current is sensed and used to identify the voltage step in the staircase which produced the resonant frequency; thereafter, the frequency sweep is discontinued, and the identified step value of voltage is applied steadily to the VCO to transmit the resonant frequency, continuously, at a level high enough and for a time long enough, to cause deactivation of the tag circuit. Since the deactivation signal is transmitted substantially only at the resonant frequency of the tag circuit, much less deactivation signal energy need be transmitted, producing savings in transmitter apparatus and power, as well as much less spectrum interference than when frequency-swept deactivation signals are used.

One known way to produce the high-powered deactivation transmission is to provide a power amplifier and a relatively high-power supply source for operating the power amplifier, and to switch the power amplifier into the transmitter signal path only when the deactivation level of signal is to be transmitted; at other times, the power amplifier is switched out of the circuit, so that only a low level of transmitted signal, suitable for the tag search operation, is transmitted at such times. Alternatively, the same amplifier may be used during both the high-power deactivation transmissions and the low-power search transmissions by appropriately changing its operating conditions to change its output power level.

While operative for its intended purposes, such a system normally requires a high-power supply source for the power amplifier, with attendant cost, bulk and heat-dissipation requirements, in order to generate deactivation transmissions of high enough intensity to destroy the resonant characteristics of any tag circuit which is close enough to the transmitter antenna to be detected during the search operation.

Accordingly, an object of this invention is to provide a new and useful method and apparatus for use in an electronic article surveillance system to produce the deactivation signals which are transmitted to the tag circuit to destroy that characteristic of the tag circuit upon which its detection depends, e.g. to destroy its resonance at the search frequency to which it is sensitive.

Another object is to provide such method and apparatus which permit use of a power supply for the transmitter apparatus which is of lower power capabilities than would otherwise be required, with resultant savings in size, cost and heat-dissipating requirements of the power supply unit.

A further object is to provide such method and apparatus which is especially adapted for use in the type of system in which the frequency of the transmissions is swept over a substantial range during the search operation, but is held substantially constant during the deactivation operation, at a frequency for which the transmissions are effective to produce deactivation of the tag circuit by destruction of its resonant characteristic.

SUMMARY OF THE INVENTION

These and other objects of the invention are achieved by utilizing as the power supply source for the transmitter, when generating the deactivation transmissions, a rechargeable electrical storage device which is capable of providing the requisite high supply power during the generation of the high-power deactivation signals, and which is rechargable by a low-power supply source during the periods between deactivation transmissions, e.g. during the search operations. Preferably the low-power supply source is the same power supply providing supply power for the entire transmitter and receiver, and the storage device is preferably a capacitor. With this arrangement, only a low-powered power supply need be provided, with consequent reduction in requirements of space, cost and heat dissipation; at the same time, the system protects against high-power lock-up, since if the transmitter stays in the deactivation state for an unduly long period, the storage device will gradually discharge and the high-powered deactivation pulses will then no longer be produced.

BRIEF DESCRIPTION OF FIGURES

The invention will be more fully understood from the following detailed description, taken with the accompanying drawings, in which.

DETAILED DESCRIPTION OF SPECIFIC EMBODIMENTS

Figure 1:
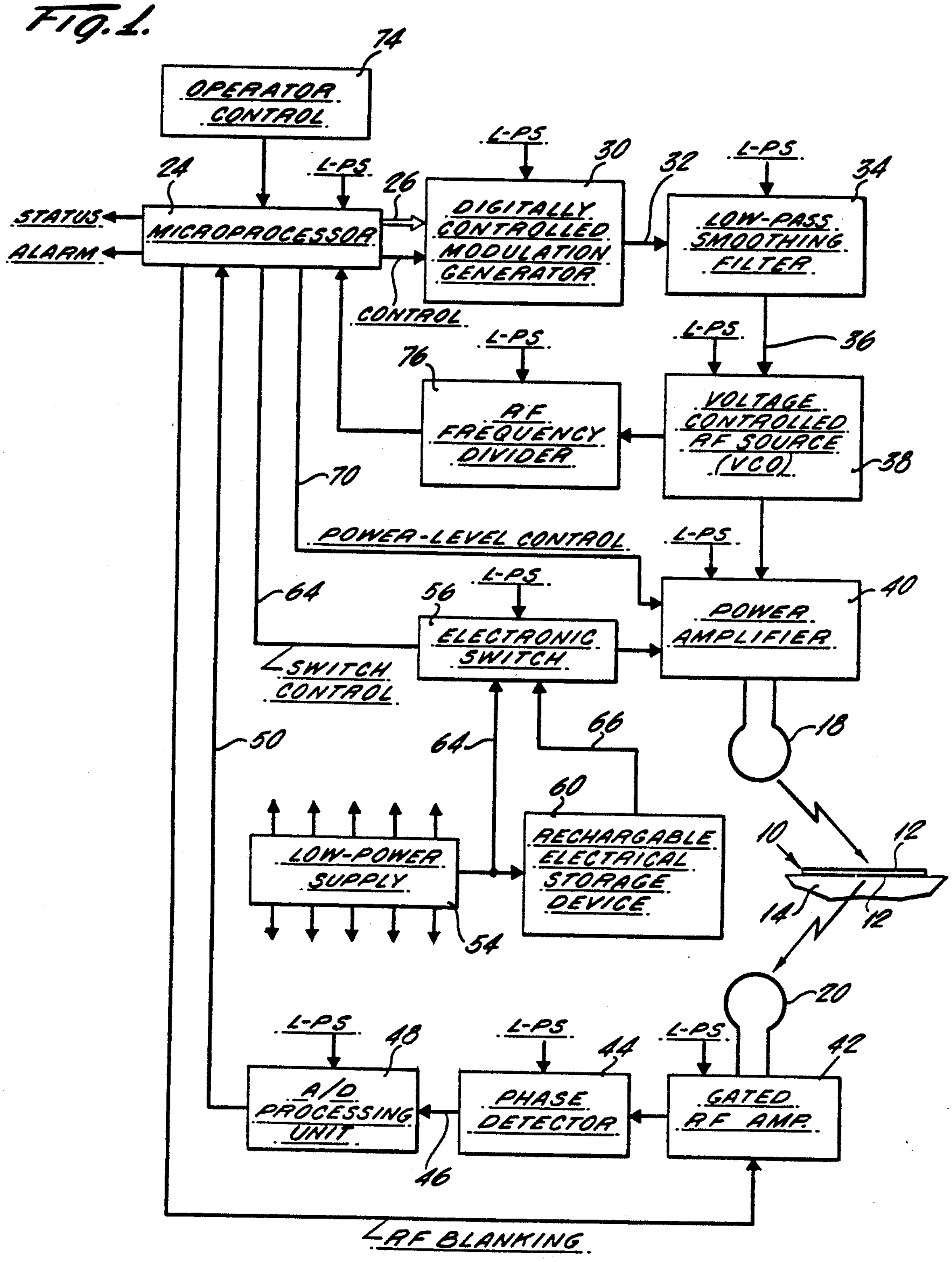
FIG. 1 is a block diagram of a system including apparatus according to the present invention.

Referring now to the specific embodiment of the invention shown in the drawings by way of example only, FIG. 1 shows an electronic surveillance system incorporating the apparatus of the present invention. A tag 10 carrying the inductor and capacitor of a resonant tag circuit 12 on its surfaces is secured to an article 14, for example to a box containing an article to be sold in a retail store. In a preferred embodiment, the tag circuit is of the type described in the above-identified patent of Lichtblau. In this example the tag is assumed to be provided with an adhesive surface in contact with the article. If such a tag circuit is taken past an exit detector which transmits signals at the resonant frequency of the tag circuit and detects resonance in the tag circuit, an alarm will be sounded or displayed, indicating an intentional or unintentional unauthorized removal of the article past the exit. In the present example, the tag and tag circuit are assumed to be sufficiently inexpensive that they are economically expendable, and are typically left on the article even when the carrier thereof is authorized to leave the protected premises. Accordingly, to avoid the generation of a false alarm at the exit detector, a tag circuit on an article whose removal is authorized should be deactivated prior to the time that it is taken past the exit detector.

To accomplish such deactivation, the apparatus of FIG. 1 is provided at a station situated along the path of the article, prior to its reaching the exit detector; typically, the apparatus shown is located on the counter of a checkout booth or at a cashier's station, where the deactivation is to occur. The system of FIG. 1 is of a type in which not only is a deactivating signal transmitted to the tag circuit to deactivate it, but a search signal is also transmitted to the tag so that the presence thereon of an intact tag circuit can be detected. This provides two principal advantages; first, when the operator moves the goods near the apparatus, the alarm produced by the presence of the tag circuit as a result of the search operation tells the operator that the tag circuit has been brought within the range for which deactivation signals will be strong enough to accomplish deactivation; furthermore, such search operation enables verification that the deactivation procedure has been successful in that, after the deactivation interval ends, the search procedure can be automatically repeated to demonstrate to the operator that the tag circuit has been deactivated, and will no longer produce an alarm at the exit detector.

In FIG. 1, 18 represents the transmitting antenna and 20 the receiving antenna of the system; it will be understood that these are shown only schematically, since their exact configuration and positioning is not relevant to the present invention. Typically, one or both may actually comprise at least two antenna loops arranged so that the near induction field of the antenna is substantial but the net field existing at large distances from the antenna is effectively zero, thereby avoiding the tendency for remote objects to produce false indications. The antennas may be placed in an opening in a counter top where the articles are presented to a cashier or, as another example, they may be contained in a hand-held electronic tool which the operator at the counter directs against the tag to accomplish the deactivation.

During the search mode of the system, a relatively low power signal of radio frequency is transmitted by antenna 18. In the search mode, by way of example, the frequency may be swept plus or minus 10% from a center frequency of about 8.2 MHz, at an 82 Hz rate. To control this generation of the search mode signals, a microprocessor 24 such as a Hitachi type 60301 C-MOS processor may be used, to produce on its output bus 26 a parallel digital count of, for example, 1 to 256. This count is supplied to digitally controlled modulation generator 30, which puts out on its output line 32 different, successively larger discrete voltage levels, one for each digital number applied to it, as shown by way of example in FIG. 2, wherein ordinates represent volts and abscissae represent time. This staircase of voltage is repeated cyclically, only two such cycles being shown in FIG. 2. In one preferred system, rest times such as A and B in FIG. 2 may be provided at the top and at the bottom of the staircase, during which measurement and automatic adjustment of transmitted carrier frequency may be effected, as described later herein.

Figure 2:
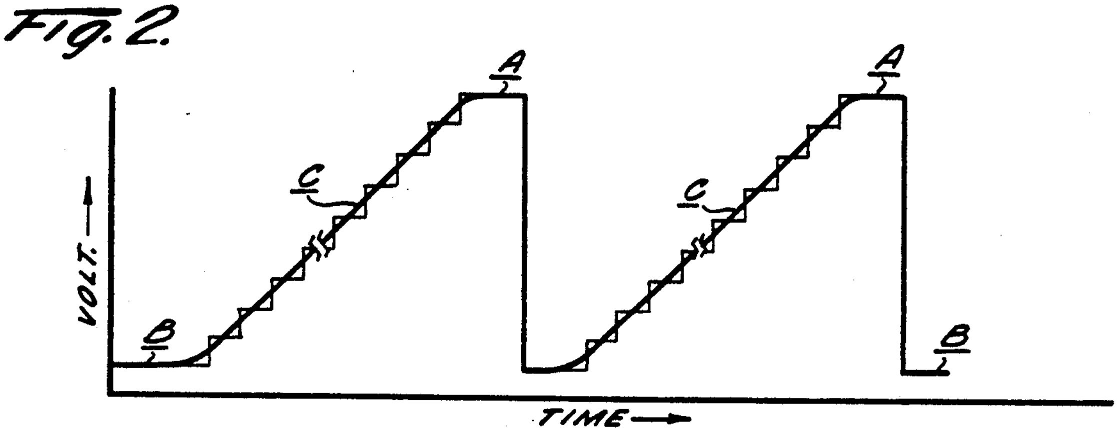
FIG. 2 is a graphical representation to which reference will be made in explaining the generation of the swept-frequency search signals.

The staircases of voltage are applied in this embodiment to a low-pass smoothing filter 34, which may for example have an upper cutoff frequency of about 1 KHz, so as to delete the high frequency components of the signal which produce the abrupt discontinuities forming the steps of the original wave form, leaving only the relatively smooth saw-tooth wave form shown at C in FIG. 2, and the longer-duration rest levels A and B. The latter saw-tooth wave form is applied over line 36 to the frequency control input of voltage controlled RF source 38, which in this example preferably comprises a voltage controlled oscillator (VCO). The output of RF source 38 then consists of an RF signal the frequency of which is swept linearly by the saw-tooth control signal.

The latter RF signal is then passed through power amplifier 40 to increase its power to a level sufficient to detect a tag circuit within the prescribed range from the antenna; the resultant frequency swept RF signal is applied to antenna 18 for transmission. In this so-called search mode, the power of the transmitted signal is sufficient to accomplish the desired detection of the tag circuit, but not sufficient to modify or destroy the tag circuit so that it will no longer be detectable.

As described in pending U.S. application, Ser. No. 07/295,064, filed Jan. 1, 1989, when the intact tag circuit is present within a prescribed range of the transmitting and receiving antenna, the receiving antenna 20 will receive signals from both the transmitter antenna and from the tag circuit which, after passing through gated RF amplifier 42 are supplied to phase detector 44; the phase detector 44 produces output signals on line 46 indicative of the fact that the tag circuit is present and intact. The latter signal is passed through an analog-to-digital processing unit 48, wherein its dynamic range is compressed and wherein it is converted from analog to digital form. The resultant signal is supplied to microprocessor 24 over line 50, as a digital indication that the target signal is present. During this process, the gated RF amplifier 42 operates at its full gain level, and it is only during the later, high-powered transmission of deactivation signals that it is gated or blanked in such a manner as to effectively reduce its gain greatly at such times, thus reducing the level of high- powered transmissions which will enter the amplifier and interfere with its immediately subsequent operation.

The digital signal on line 50 signals the microprocessor that the tag circuit is within range, and that deactivation signals should be transmitted. The microprocessor then holds its output digital count at that value for which the tag circuit was detected, and accordingly the frequency of the signal from RF source 38 is held at the frequency to which the tag circuit resonates. The power amplifier is at that time switched from its low-power state to its high-power deactivation state and the resultant deactivation signals transmitted to the tag circuit to deactivate it.

The supply power for operating the system originates in low-power supply 54, which supplies low-power operating voltage to each of the electronic elements of the system, either directly as indicated by the arrows marked L-P S in FIG. 1 or, in the case of power amplifier 40, by way of electronic switch 56. In accordance with the invention, low-power supply 54 is connected to rechargeable electrical storage device 60 to charge it up, except during the deactivation intervals, at which times electronic switch 56 responds to a control signal delivered to it over line 64 from the microprocessor to connect the rechargeable electrical storage device 60 to the power-consuming supply electrodes of power amplifier 40. At the end of the deactivation interval, the control signal on line 64 operates electronic switch 56 to its original state, in which it connects the output line 64 of low-power supply 54 to power amplifier 40 and disconnects the output line 66 of the rechargeable electrical storage device 60 so the device can recharge from the low-power supply prior to the next deactivation interval.

Figure 3:
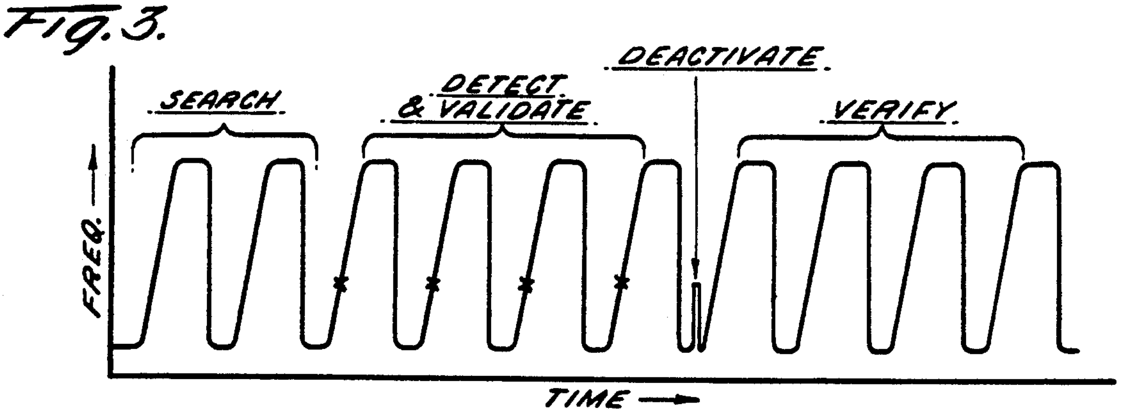
FIGS. 3 through 5 are other graphical representations to which reference will be made in describing the operation of the system in accordance with the invention.

The general operation of the overall system will be readily understood from FIG. 3, wherein is shown the frequency of the voltage-controlled oscillator of RF source 38 as a function of time, for a few representative frequency sweeps. During an initial number of sweeps designated "Search" in this example, there is no target circuit within range of the equipment. During a next set of sweeps, designated "Detect and Validate", a target circuit resonant at the frequency marked X in FIG. 3 is assumed to be present, and is detected by phase detector 44. After dynamic-range compression and A/D conversion in unit 48, the signals supplied over line 50 to microprocessor 24 are analyzed in the microprocessor to determine the presence of a true target circuit. There are many ways in which this can be done by appropriate programming of the microprocessor, but since they are not of the essence of this invention they are not described here in detail. Among such procedures are storing the "signature" or typical signal due to a true tag circuit and comparing it with the received signals; comparing returns from successive sweeps to ascertain that the same type of return is being received repetitively; and detecting and cancelling out long-term persistent spurious signals due to fixed, non-target objects, as examples.

The microprocessor also stores and keeps track of which digital number on its output bus 26, and hence which value of transmitted frequency, produced the true tag-circuit signal, taking into account delays occurring in space transit and in the circuits of the system. Having thus determined the transmitted search frequency which resonates the tag, the microprocessor holds the corresponding digital count on bus 26, so as to maintain transmission of the tag-circuit resonant frequency during the period indicated as "Deactivate" in FIG. 3. At the beginning of this interval, the microprocessor 24 supplies a control signal over control line 70 to power amplifier 40 to cause it to switch from its low-power state to its high-power state, so it will transmit a sufficiently high level of signal to deactivate the tag circuit; also at this time, the microprocessor operates the electronic switch 56 over control line 64 to its position in which the rechargeable electrical storage device 60 provides operating supply power to the power amplifier 40.

Accordingly, despite the use of only a relatively low-power supply 54, the power amplifier 40 is able to operate at the high power necessary for deactivation because of the supply of operating power to it from the charged-up, rechargeable electrical device during the deactivation intervals. While a capacitor is preferably used as the storage device, other devices such as a rechargable battery may be used instead.

Following a typical deactivation interval (typically of the order of 100 microseconds), the microprocessor automatically switches to the "Verify" mode shown in FIG. 3, during which the search operation is resumed to determine whether or not the tag circuit is still present. In FIG. 3 it is assumed the tag circuit has been successfully deactivated, in which case the microprocessor then switches the system to its original search mode. The same search, detect and validate, and deactivate steps are repeated, if, during the Verify interval, a tag circuit is not detected. If a tag-circuit is detected during the Verify procedure, the system reverts to the Deactivate mode, and Deactivation and Verification are repeated until the tag-circuit signals disappear and successful deactivation has been finally obtained.

Figure 4:
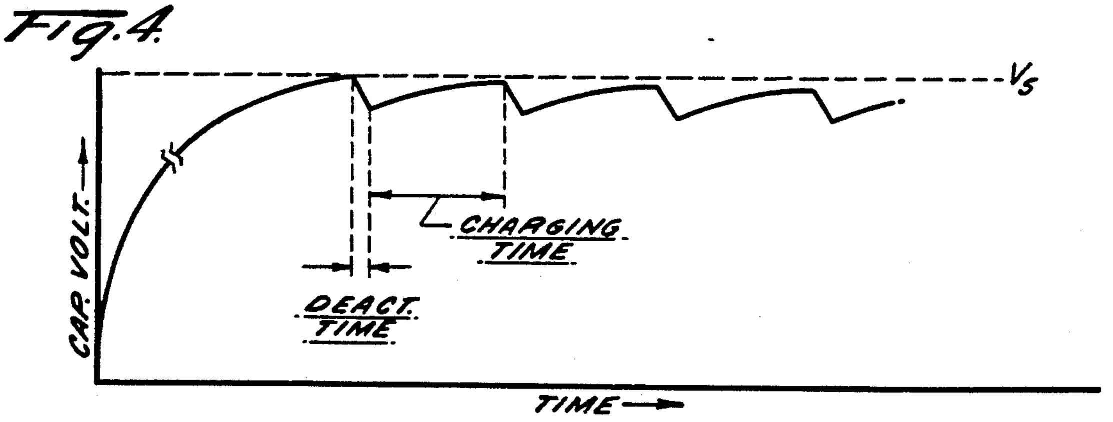

FIG. 4 illustrates a case in which the above-described Search, Detect and Validate, Deactivate and Verify operations occur and are repeated a number of times, and the Verify mode does not indicate that successful deactivation has occurred. While this may conceivably occur due to a tag circuit which was incorrectly made, so that the deactivation signals are unable to destroy the tag's resonant characteristic, it is much more commonly due to reflections of signals from nearby metallic non-tag sources, or from tag circuits so far away that they cannot be deactivated. In this case, the microprocessor preferably notes the failure to deactivate after a predetermined number N of deactivation pulses, and initiates an adaptive procedure in which it treats the target as spurious and thereafter ignores it. Before N such deactivation intervals have occurred, the capacitor voltage will vary substantially as shown in FIG. 4; during the deactivation interval the capacitor discharges somewhat, but still maintains sufficient power to operate the output power amplifier at the level required for deactivation, after which it is recharged from the low-voltage power supply prior to the next deactivation interval power supply.

Figure 5:
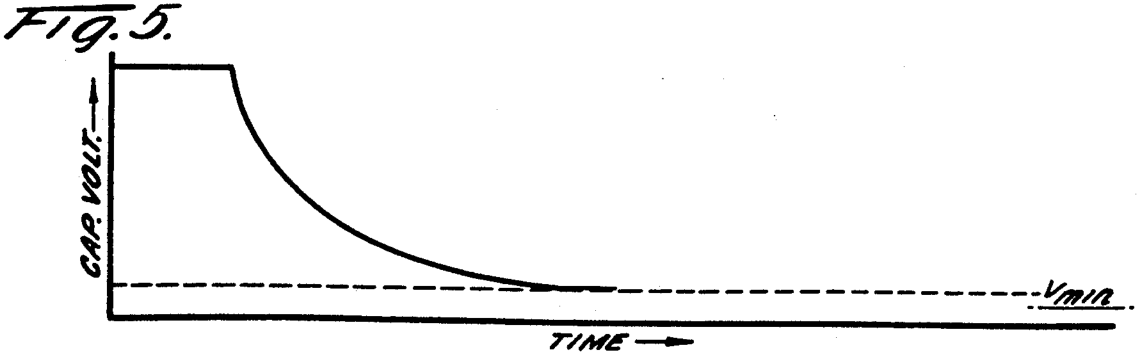

In FIG. 5 it is assumed that, due to a malfunction the electronic switch 56 remains or "sticks" in the position to produce the high-power deactivation signals. If this occurs, a condition exists which is termed "Deactivation Lock-up". As shown in FIG. 5, the arrangement of the present invention prevents this from continuing indefinitely and possibly harming the equipment, by virtue of the fact that when in deactivation lock-up, the capacitor discharges continuously and its voltage eventually falls to the point where the power amplifier is no longer operating at the high power level typical of normal deactivation.

FIG. 1 also shows an operator control unit 74 for setting up and adjusting the microprocessor, and status and alarm outputs from the microprocessor which indicate the status of operation of the microprocessor and provide an audible and/or visual alarm when a tag circuit is detected.

Also shown in FIG. 1 is an RF frequency divider 76 which senses the frequency of the VCO during the "rest" intervals A and B of FIG. 2, and provides microprocessor 24 with corresponding signals enabling it to adjust properly the frequency of the VCO during the rest periods. These and other preferred, detailed features of the overall system are not essential to the present invention, hence are not described further.

Figure 6:
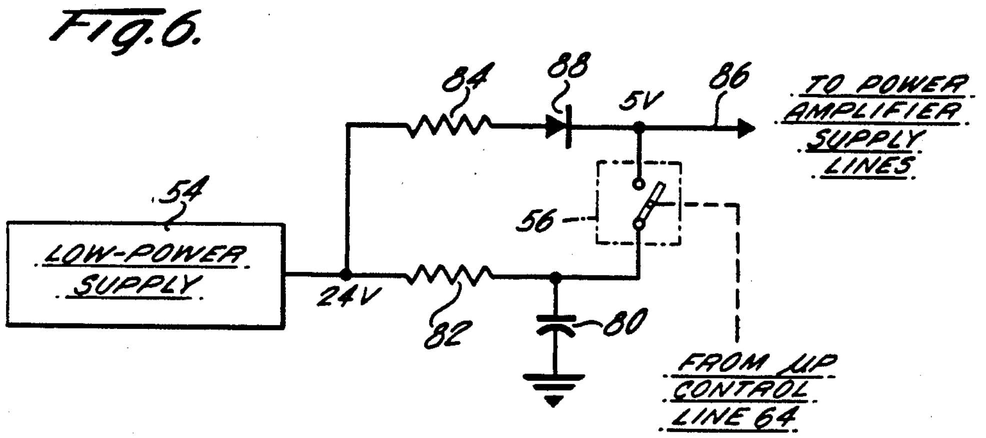
FIG. 6 is a schematic diagram showing a preferred form of the electronic storage device and electronic switch, and their preferred connections in the system.

FIG. 6 shows a preferred connection of the rechargeable electronic storage device, in this case a capacitor 80. The low-power supply 54 is connected to the capacitor by a charging resistor 82, which is large enough to avoid overloading the low-power supply when the capacitor is charging, yet permits it to charge nearly fully during the intervals between deactivation intervals. With supply, a charging resistor of about 200 ohms may be used with a capacitor of about 1,000 microfarads, as an example.

Also provided in this embodiment is a voltage-dropping resistor 84 (which may instead be an appropriate voltage regulator) for holding line 86 at a low voltage, such as 5 volts, when the electronic switch 56 is in the position shown in solid line. When the switch is actuated to its alternate position shown in broken line, by the microprocessor control signal on line 64, line 86 carries the higher voltage (typically 20 volts) present on capacitor 80; diode 88 isolates line 86 from resistor 84 when the higher voltage from the capacitor is on line 86. Accordingly, line 86 carries, for example, about 20 volts during deactivation and about 5 volts at other times.

Figure 7:
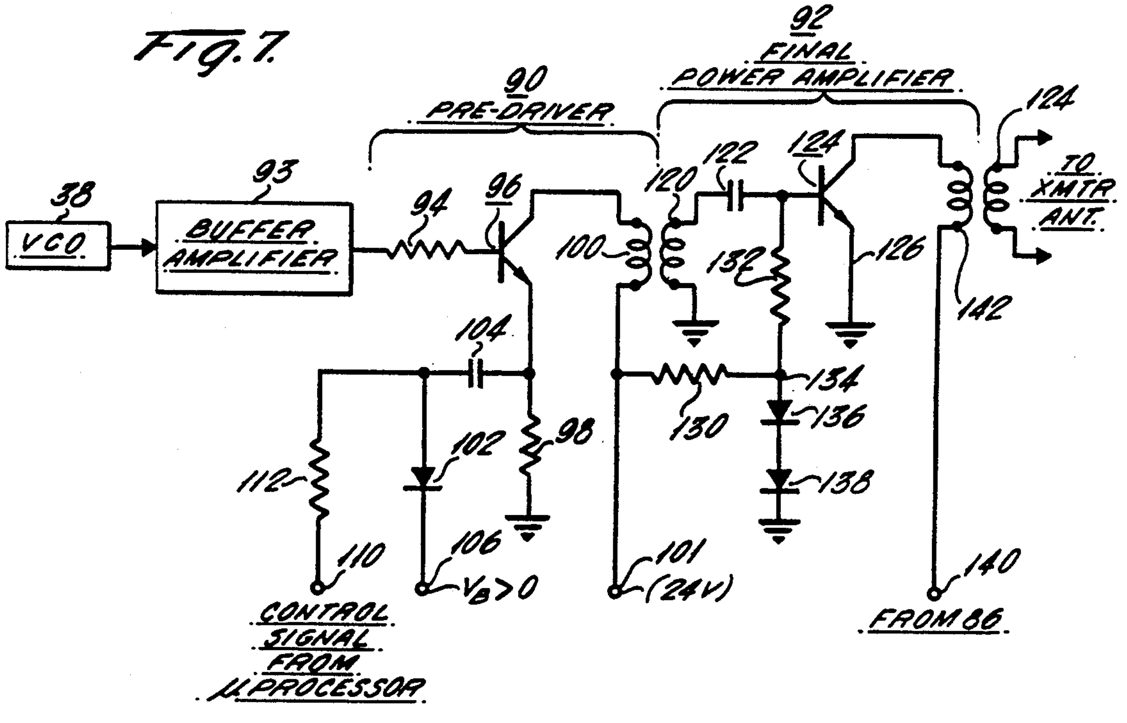
FIG. 7 is a schematic diagram showing a preferred form of controlled power amplifying means used to generate both high and low power transmissions, in accordance with a preferred embodiment of the invention.

FIG. 7 shows a specific preferred embodiment of power amplifier 40 which responds to RF signals from VCO 38 to produce search and deactivation levels of transmissions under control of the control voltage on line 70 of FIG. 1 and in response to the two different levels of supply voltage on output line 86 of electronic switch 56.

More particularly, in this example the power amplifier 40 comprises a pre-driver amplifier 90 and a final power amplifier 92. The VCO 38 supplies its RF signal through an isolating buffer amplifier 93 and series resistor 94 to the base of a transistor 96 having its emitter connected to ground through a biasing resistor 98 and having its collector connected through transformer primary winding 100 to the low-power supply terminal 101 (which may be at 24 volts). When diode 102 is forward-biased, it presents a low RF impedance across resistor 98 by way of capacitor 104, but when reverse-biased it presents a high impedance. The cathode of diode 102 is connected to bias terminal 106, which is maintained at a bias somewhat above ground ($V_B$ greater than 0). The control voltage from the microprocessor at terminal 110, acting through resistor 112, switches the diode 102 to its high-impedance state when low-level search signals are to be produced and the transistor is to act as a relatively low-level but linear amplifier, and to its low-impedance state when it is to act as a high-gain Class C amplifier.

The signals from pre-driver 90 are supplied to transformer secondary winding 120 and through coupling capacitor 122 to the base of a power transistor 124, the emitter of which is grounded through biasing resistor 126. Biasing of the base of transistor 124 is provided from supply terminal 101 by way of resistors 130 and 132, the junction 134 of which resistors is grounded through a series pair of clamping diodes 136 and 138. The collector of transistor 124 is connected to controlled supply terminal 140 by way of output transformer primary 142, the secondary 144 of which transformer drives the transmitter antenna 18.

In the operation of the circuit of FIG. 7, during deactivation intervals the control signal from microprocessor 24 supplied to bias terminal 110 places pre-driver 90 in its high-gain state; electronic switch 56 is at the same time actuated to connect capacitor 80 to the collector supply terminal 140 for the final power amplifier 92, to operate it in its high-power mode and thus provide antenna 18 with high-power deactivation signals as desired. At all other times, the control signal at bias terminal 110 holds the pre-driver in its low-power, linear state, and the electronic switch 56 disconnects the capacitor 80 from collector supply terminal 140, permitting it to charge up again through resistor 82 from the low-power supply; the collector supply terminal 140 is at such times supplied with low operating voltage from the low-power supply 54 by way of resistor 84, as is adequate for search operations. Typically, the deactivation may be about 100 microseconds, and the time for a single search saw-tooth may be about 500 times longer, providing adequate recharging time for capacitor 80.

Using such a system, a low-power supply nominally rated as having a 20 milliampere capability can provide 2 amperes peak current during the deactivation interval.

There has therefore been provided a method and apparatus which permit use of a relatively low-power supply source to operate an electronic article surveillance system at relatively low power levels during search, while providing sufficient supply power to operate the transmitter at very much higher levels during deactivation intervals.

While the invention has been described with particular reference to specific embodiments thereof in the interest of complete definiteness, it may be embodied in a variety of different forms diverse from those specifically shown and described without departing from the spirit and scope of the invention.

What is claimed is:

1. In an electronic article surveillance system:

transmitter means operative, when supplied with low operating supply power from a low-power DC source, to transmit first oscillatory search signals of a first low-power level at the resonant frequency of a tag circuit to be detected, and to transmit second oscillatory deactivation signals of a second higher power level when supplied with higher DC operating supply power from a higher powered DC source;

a low-power DC supply source for supplying said low operating supply power to said transmitter means during transmission of said oscillatory search signals of said first low-power level;

rechargeable electronic storage means, and means connecting said rechargeable electronic storage means so as to be charged by said low power DC supply source in the times between transmissions of said second oscillatory deactivation signals; and electronically controlled switch means for connecting said rechargeable electronic storage means to supply said higher operating power to said transmitting means when it is transmitting said deactivation signals.

2. The apparatus of claim 1, wherein said rechargable electronic storage means comprises a capacitor and said connecting means comprises electrically resistive means connecting said capacitor to said low-power supply source.

3. The apparatus of claim 2, wherein said switch means comprises an electronic switch responsive to the detection of a tag circuit by said apparatus to connect said rechargeable electronic storage means to said transmitter means for a period sufficient to accomplish deactivation of said tag circuit.

4. In an article surveillance system, apparatus for transmitting relatively low-power search signals during first intervals and relatively higher power deactivating signals during second intervals, comprising:

rechargable electrical storage means;

a low-power DC supply source for charging said electrical storage means;

transmitter means operative in response to low supply power from said low-power supply means for transmitting relatively low-power oscillatory search signals, and operative in response to supply power from said electrical storage means for transmitting said relatively higher-power oscillatory deactivating signals; and means for supplying said relatively low supply power to said transmitter means from said low-power supply means during said first intervals to transmit and search signals and for supplying said relatively higher-power signals thereto from said electrical storage means during said second intervals to transmit said deactivating signals.

5. A method for providing operating supply power to transmitter means in an electronic surveillance system to transmit relatively low-power oscillatory search signals during first intervals and to transmit relatively higher-power oscillatory deactivating signals during second intervals, comprising:

supplying said transmitter means with its operating power from a rechargeable electrical storage device during said second intervals to produce said higher-power deactivating signals;

charging said rechargable electrical storage device from a low-power supply, at least during said search intervals; and supplying said transmitter means with its operating supply power from said low-power supply source at least during said first intervals to produce said lower-power search signals.

6. In a system for detecting and thereafter deactivating a tag circuit which is originally electrically resonant but is responsive to a deactivating level of radiated signal impingent thereon to destroy said resonant characteristic, said system comprising:

transmitter means having a search state in which it radiates first signals, some of which are substantially at said resonant frequency and at a first power level sufficiently low to leave said resonant characteristic intact;

receiver means responsive to signals produced by said tag circuit in response to said first transmitted signals, to produce signals indicative of the presence of said tag circuit only so long as said tag circuit exhibits said resonant characteristic;

said transmitter means having a deactivation state in which it radiates signals substantially at said preselected resonant frequency and at a second power level sufficiently high to destroy said resonant characteristic of said tag circuit; and control means responsive to said tag indicating signals to place said transmitter means in said deactivation state in response to occurrence of said tag-indicating signals;

the improvement wherein said transmitter means comprises low-power supply means, electrical storage means, means for charging said electrical storage means from said low-power supply means while said transmitter means is in said search state, signal amplifying means for amplifying signals to be radiated by said transmitter means, and means for supplying said signal amplifying means with supply power from said electrical storage means when said transmitter means is in said deactivation state and directly from said low-power supply when said transmitter means is in said search state.

7. The system of claim 6, wherein said electrical storage means comprises capacitive means.

8. The system of claim 7, comprising resistive means connecting said electrical storage means to said low-power supply means.

9. The system of claim 6, wherein said electrical storage device comprises a rechargeable battery.

10. The system of claim 6, wherein said amplifying means is responsive to a first control signal to vary its signal gain, said amplifier means being connected to said electrical storage means to receive its operating supply voltage therefrom while said transmitter means is in said deactivation state, and being disconnected from said electrical storage means and supplied with operating supply power from said low-power supply means at other times.

* * * * *